United States Patent [19]
Russell

[11] Patent Number: 6,151,114
[45] Date of Patent: Nov. 21, 2000

[54] COHERENT LASER WARNING SYSTEM

[75] Inventor: James C. Russell, Bellevue, Wash.

[73] Assignee: The Boeing Company, Seattle, Wash.

[21] Appl. No.: 09/052,759

[22] Filed: Mar. 31, 1998

[51] Int. Cl.[7] .................................................. G01B 9/02
[52] U.S. Cl. ......................... 356/352; 356/346; 356/345
[58] Field of Search ........................ 250/214 R; 356/352, 356/346, 345

[56] References Cited

U.S. PATENT DOCUMENTS

| | | |
|---|---|---|
| 3,824,018 | 7/1974 | Crane, Jr. . |
| 4,222,667 | 9/1980 | Layne ...................................... 356/346 |
| 4,515,478 | 5/1985 | Ballard et al. . |
| 5,040,891 | 8/1991 | Björkman . |
| 5,151,585 | 9/1992 | Siebert . |
| 5,245,408 | 9/1993 | Cohen . |
| 5,260,563 | 11/1993 | Hunter et al. . |
| 5,440,116 | 8/1995 | Bolander et al. . |
| 5,541,728 | 7/1996 | Dierking ................................. 356/346 |
| 5,606,419 | 2/1997 | Foosnaes et al. ....................... 356/419 |
| 5,781,293 | 7/1998 | Padgett et al. .......................... 356/346 |

*Primary Examiner*—Frank G. Font
*Assistant Examiner*—Andrew H. Lee
*Attorney, Agent, or Firm*—Christensen O'Connor Johnson Kindness PLLC

[57] ABSTRACT

An interferometer, preferably a wedge etalon, produces a spatial pattern of fringes when incident radiant energy is coherent. A system for analyzing these fringes uses a transform operation to detect spatial regularity. The transform operation may be electronic (computational) based on the output of individual photodetectors of an array disposed adjacent to the interferometer, or optical by a Fourier transform lens disposed adjacent to the interferometer. In either case, the combination of fringe creating element and transform operation permits the unambiguous detection of light with a coherence length longer than that of natural light, such as from a laser.

13 Claims, 7 Drawing Sheets

DETECTOR PLANE ONLY RECEIVES ENERGY FROM ONE APERTURE AT A TIME.

COHERENT LASER WARNING SYSTEM

FIELD OF THE INVENTION

The present invention relates to a system for detecting coherent radiant energy, particularly a continuous wave or pulsed laser beam incident upon an object.

BACKGROUND OF THE INVENTION

A laser converts input power into a very narrow, intense beam of coherent radiant energy at a single frequency. Military applications for lasers include range finding and target designators, including beam-rider guidance for "smart" ordinance. On the defensive side, laser warning devices can be located on or in close vicinity to potential military targets.

Lasers may operate either continuously or in a pulsed mode. High power lasers of the type used in military applications usually operate in pulsed mode due to input power and cooling requirements.

Some known laser warning devices are actuated by a rapid increase in incident radiant energy, indicative of a high power pulse.

Other known laser warning devices exploit the coherence of laser energy. One such approach is to use an interferometer which may be designed and constructed so as to provide interfering radiation beam components, such that intensity spikes and nulls are observed for coherent radiation of the design frequency but not for noncoherent radiation. Filtering of noncoherent radiation is particularly important considering the environment for laser warning devices. The intensity of background noncoherent radiation will vary widely from the black of night to the light of day, and may be subjected to temporary sharp increases such as momentary reflected sunlight and/or proximal detonations. One such interferometer which has been used for laser warning is known as a Fabry-Perot interferometer or etalon, consisting of two partially silvered mirrors at a fixed distance apart to produce multiple reflected interference spectra of high dispersion and resolution for selected frequencies. At such frequencies, constructive interference occurs between the mirrors and an intensity spike is observed at the side opposite the incident side when the spacing satisfies integral solutions of:

$$\frac{2n' h \cos \theta'}{\lambda_0} + \frac{\varphi}{\pi} \quad (1)$$

where:

n'=the material index of refraction at the wavelength $\lambda_0$;

h=the mirror spacing;

θ'=the internal angle of reflection; and

φ=the phase change upon reflection.

Devices representative of those using etalons are disclosed in the following U.S. patents: Crane, Jr. U.S. Pat. No. 3,824,018, issued Jul. 16, 1974; Ballard et al. U.S. Pat. No. 4,515,478, issued May 7, 1985; Siebert U.S. Pat. No. 5,151,585, issued Sep. 29, 1992.

More specifically the "Coherent Light Source Detector" of the Crane, Jr. patent uses an etalon which is "scanned" by angularly moving it about an axis perpendicular to its optical axis. In this way the effective thickness of the etalon is continuously changed for coherent radiation at a given angle of incidence, and intensity spikes should be observed for coherent radiation having a frequency in a predetermined range.

The Ballard et al. patent addresses the problem of widely varying background illumination and laser intensity for a coherent frequency of interest. The invention involves directing light passing through the interferometer onto an array of photosensitive elements, and analyzing the intensity detected by such individual elements, particularly by determining an average intensity, to detect the interference pattern or fringes.

The Siebert patent is directed to a system in which adjacent etalons of different thicknesses are disposed close to separate photo detectors, in combination with "modulating" the incident radiation by transverse movement of the stepped etalon structure with a back and forth oscillatory motion over the detector elements. As stated in the Siebert patent, > However, for coherent signals, interference effects cause each etalon 12 step to have a different transmission, depending on the wavelength of the incident light, and on the etalon 12 thickness (excluding the steps). The angle of arrival of the coherent signal also has a small effect. Preferably, the etalon 12 is designed such that its mean optical thickness ($2nd\cos\theta_n$), where n is the etalon index of refraction, d its average thickness, and $\theta_n$ the angle of the light in the etalon 12, is substantially larger than the coherence length of incoherent background sources, while also being substantially less than a coherence length of coherent sources that it is desired to detect. Thus, the average etalon 12 thickness determines the coherent/incoherent discrimination ability of the etalon 12.

Thus the object of Siebert is similar to that of Crane, Jr., i.e., effecting a change in the effective thickness of the etalon with respect to an adjacent detector for the purpose of determining whether or not incident radiation is sufficiently coherent as to produce fringes.

SUMMARY OF THE INVENTION

The present invention provides a coherent laser warning system using an interferometer to create a spatial pattern of fringes when incident radiant energy is coherent, and a system for analyzing these fringes using a transform operation. The fringes may be formed by a planar wedge etalon or a collection of planar etalons disposed at angles relative to each other. The transform operation may be electronic (computational) or optical (Fourier transform optical lens). The combination of fringe creating element and transform operation permits the unambiguous detection of light with a coherence length longer than that of natural light, such as from a laser.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The coherent laser warning system in accordance with the present invention detects the presence of incident radiation which is substantially coherent, such as the light from a laser. This detection is accomplished by transforming the incident coherent energy into a series of spatial fringes by means of an interfering structure, followed by processing using a Fourier transform and detection of the resulting fringes. As described in more detail below, this concept has been investigated experimentally, particularly for the laser wavelengths most often encountered in military applications. However, the particular wavelengths, dimensions, detector arrays, and so on, described below should be considered to be representative of an experimental embodiment of the invention, and not necessarily limiting as to the scope of the invention.

Figure 1:
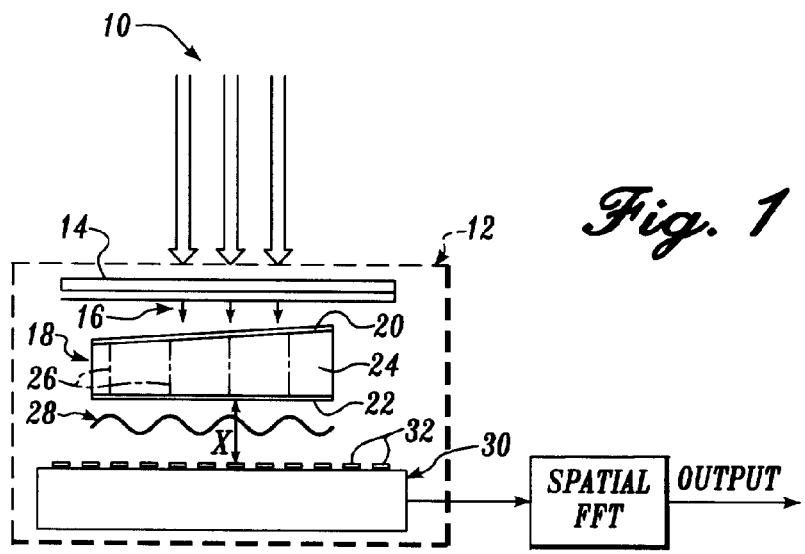
FIG. 1 is a diagrammatic side elevation of a first embodiment of coherent laser warning system in accordance with the present invention, including a wedge etalon and a photodetector array.

In the embodiment illustrated diagrammatically in FIG. 1, in which the dimensions are greatly exaggerated for ease of illustration and explanation, radiant energy 10 is incident upon a detector 12 in accordance with the present invention. The detector can include a spectral bandpass filter 14 to eliminate energy outside the range of interest and/or adjust intensity to a level consistent with the other components of the detector. Energy 16 passed by the filter is incident upon an interfering element 18 of special design. In the embodiment illustrated in FIG. 1, the interfering element 18 is a "wedge etalon" having a planar partially reflective top surface 20 and planar partially reflective bottom surface 22 separated by a light transmissive spacer material 24. Unlike a traditional etalon, the partially reflective surfaces 20 and 22 are disposed at a small angle relative to each other, rather than being parallel. It is important that the thickness of the etalon, i.e., the minimum space between the surfaces 20 and 22, be large enough that natural or white light will not produce detectable fringes. In an experimental embodiment, the minimum thickness is about 0.5 millimeter. The angle of the wedge is selected such that constructive interference occurs at several locations along its length for coherent light having long wavelengths ($\lambda$) within the range of interest. For experimental purposes, that range is about 532 nanometers to about 1600 nanometers, and the thickness of the wedge etalon at the wider side is approximately 10 of the longer wavelengths more than at the thinner side. In the experimental embodiment, the wedge etalon is approximately one-quarter inch wide by one-quarter inch long, resulting in a wedge angle ($\alpha$) of much less than one degree, preferably approximately 0.06 degree. For coherent incident radiation, constructive interference occurs at a plurality, preferably several, locations along the length of the etalon at intervals of $\lambda \div 2n'\alpha$. In FIG. 1, the dot dash lines 26 represent locations at which constructive interference occurs. Line 28 represents the interference pattern, i.e., the intensity spikes and nulls resulting from coherent incident radiation.

Figure 2:
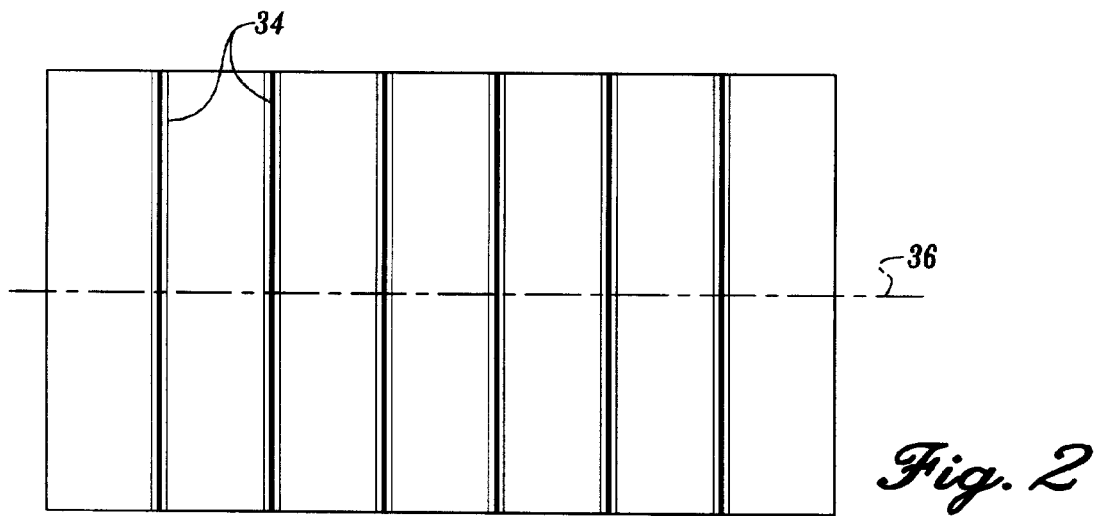
FIG. 2 is a representation of a two dimensional intensity pattern created in the system of FIG. 1 in the plane of the detector array.
Figure 3:
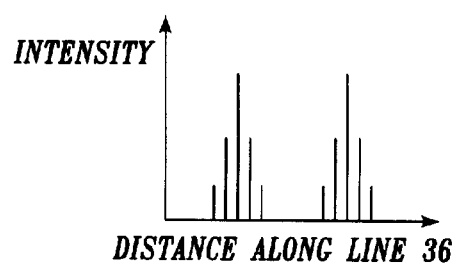
FIG. 3 is a graph representing a portion of the intensity pattern of FIG. 2.

The shape of the intensity curve will vary depending on many factors as discussed in more detail below. For some conditions the intensity spikes will be narrower (sharper) than for others. A photodetector component 30 having a rectangular array of individual photodetectors 32 is positioned directly below the etalon 18. In the experimental embodiment, the two dimensional photodetector array used was from a conventional digital camera (Casio QV-10), with a pixel pitch of about 35 microns. A visual representation of the two dimensional pattern detected by the camera array is illustrated in FIG. 2. The dark bands 34 represent the intensity spikes corresponding to the locations of the wedge etalon where constructive interference occurs for the coherent incident light. The intensity spikes will be closer together for higher frequencies (shorter wavelengths) and farther apart for lower frequencies (longer wavelengths). It is not necessary to use a two dimensional array in the present invention, a linear array of one to four rows of pixels is sufficient to detect the intensity spikes. For example, FIG. 3 represents the intensities detected along a portion of line 36 of FIG. 2.

In the preferred embodiment all of the components 14 (filter), 18 (interference element), 30 (photodetector) are stationary relative to each other, being mounted in a common housing or frame represented by the broken line box in FIG. 1.

In theory, coherent incident energy would result in well localized intensity spikes. However, manufacturing tolerances result in less than perfect intensity spikes. In addition, in conventional photodetector arrays, high intensity results in saturation of photodetectors and bleeding or spreading to adjacent detectors. Thus, intensity bands of several pixels may result. In the present invention, intensity peaks are separated by a sufficient number of pixels, preferably at least 19 or 20, that saturation, spreading, or bleeding, and manufacturing limitations do not affect the ability to detect the intensity spikes over the frequency range of interest.

Figure 4:
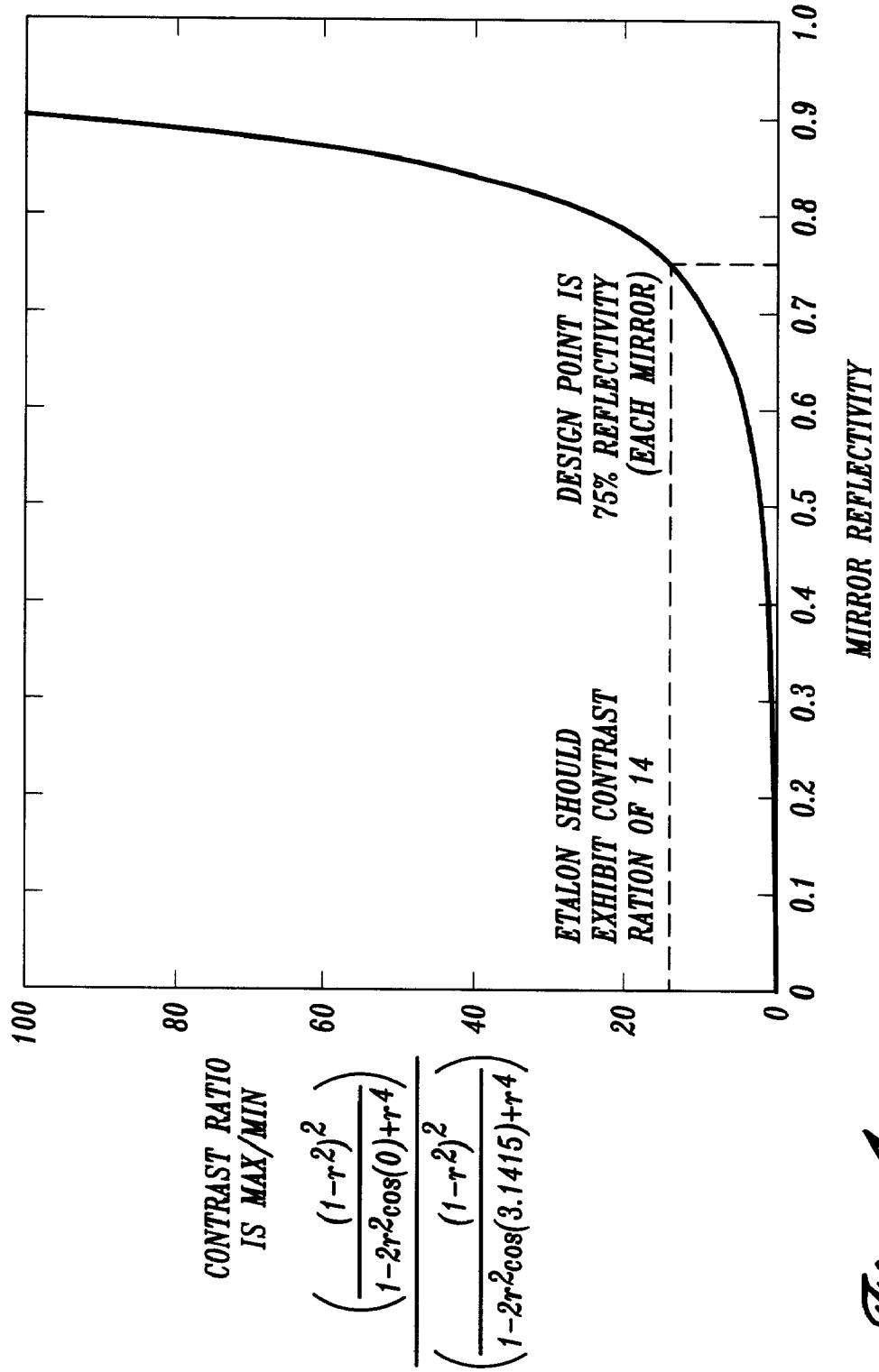
FIG. 4 is a graph illustrating the affect of varying one aspect of the system of the present invention (mirror reflectivity for a wedge etalon) on another aspect of the present invention (contrast ratio).
Figure 5:
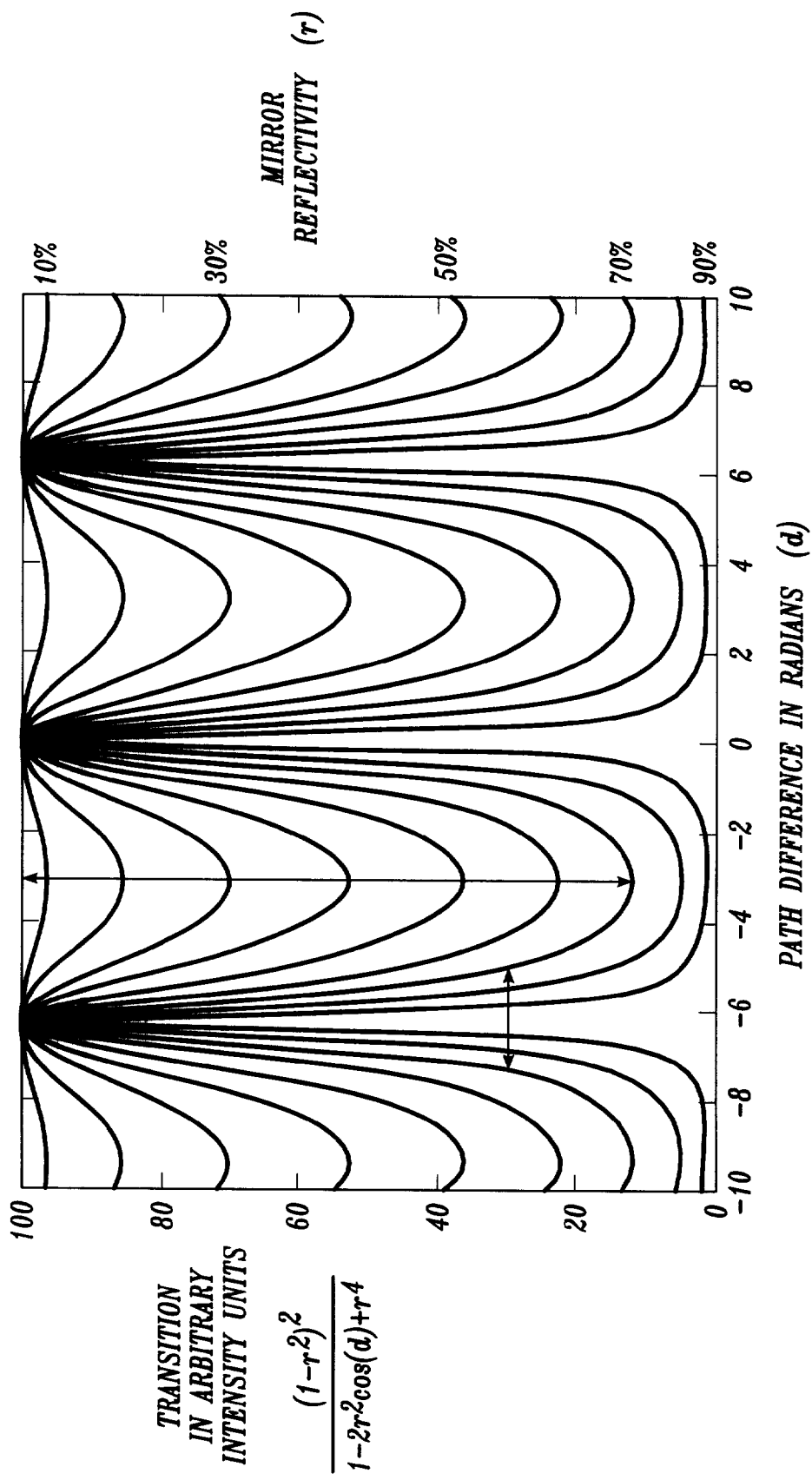
FIG. 5 is a graph illustrating the relationship between other aspects of the present invention, namely, fringe intensity contours as compared to mirror reflectivity of an etalon and path length of the etalon at a fixed wavelength.

There are a number of factors that affect the fringe intensity and contour or pattern, which, in turn, affect the ability of the system in accordance with the present invention to detect coherent incident energy. FIG. 4 represents fringe contrast ratio as compared to mirror reflectivity r. For high reflectivity, the contrast between fringe intensity spikes and nulls is very high, whereas the contrast decreases for decreased reflectivity. In the experimental embodiment, the mirrors were formed by vacuum evaporation of pure aluminum on glass to a thickness of about 40 nanometers, resulting in reflectivity of 75%. This resulted in a contrast ratio of 14, easily detectable in the system of the present invention. FIG. 5 shows another effect of reflectivity and indirect effect of contrast ratio, namely, the fringe intensity contour for different mirror reflectivities. One notable aspect of FIG. 5 is that the intensity spikes remain high even when reflectivity is high.

Other factors that affect the state of the fringes, whether sharp or diffuse, include etalon wedge angle, angle of incidence of the radiation, thickness of the etalon, distance from the etalon to the detection plane (dimension X in FIG. 1), wavelength of illumination, type of reflector, and the refractive index of the etalon spacer material.

Figure 6:
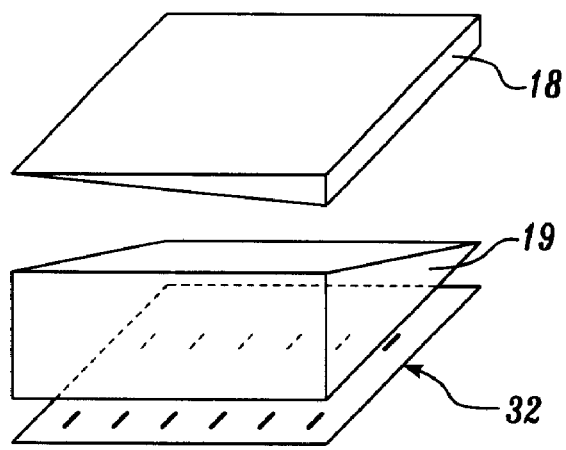
FIG. 6 is a diagrammatic perspective of a modified form of coherent laser warning system in accordance with the present invention, using a prism between a wedge etalon and a photodetector array.

Under some conditions the intensity of the fringes can go to zero, and systems based simply on scalar intensity may be limited in incidence angle. Phase information is still present, even when intensity in the fringe field is uniform. This phase information may be used to recover a fringe structure by interference with a plane wave reference. Similarly, intensity and phase interact with distance from the etalon, so if at one point the contrast of fringes goes to zero, at a point closer or farther from the etalon the contrast will not be zero. In general, a system employing a wedge etalon with a requirement for wide acceptance angle will require some means of utilizing this phase information, either by interference or by variable path length. An instantiation of this could be a prism disposed at right angles to the wedge angle so that different portions of each fringe experience different path lengths to a two dimensional detector array. For example, FIG. 6 shows one possible arrangement of wedge etalon 18, prism 19 and detector array 32.

The entire parameter space has not been fully analyzed, due to the lengthy computations. Nevertheless, based on the experiments conducted to date and described herein, it has been established that etalons can be produced which work with known photodetector arrays to produce detectable fringe patterns for coherent energy having wavelengths within the range of the wavelengths currently used for military applications.

Figure 7:
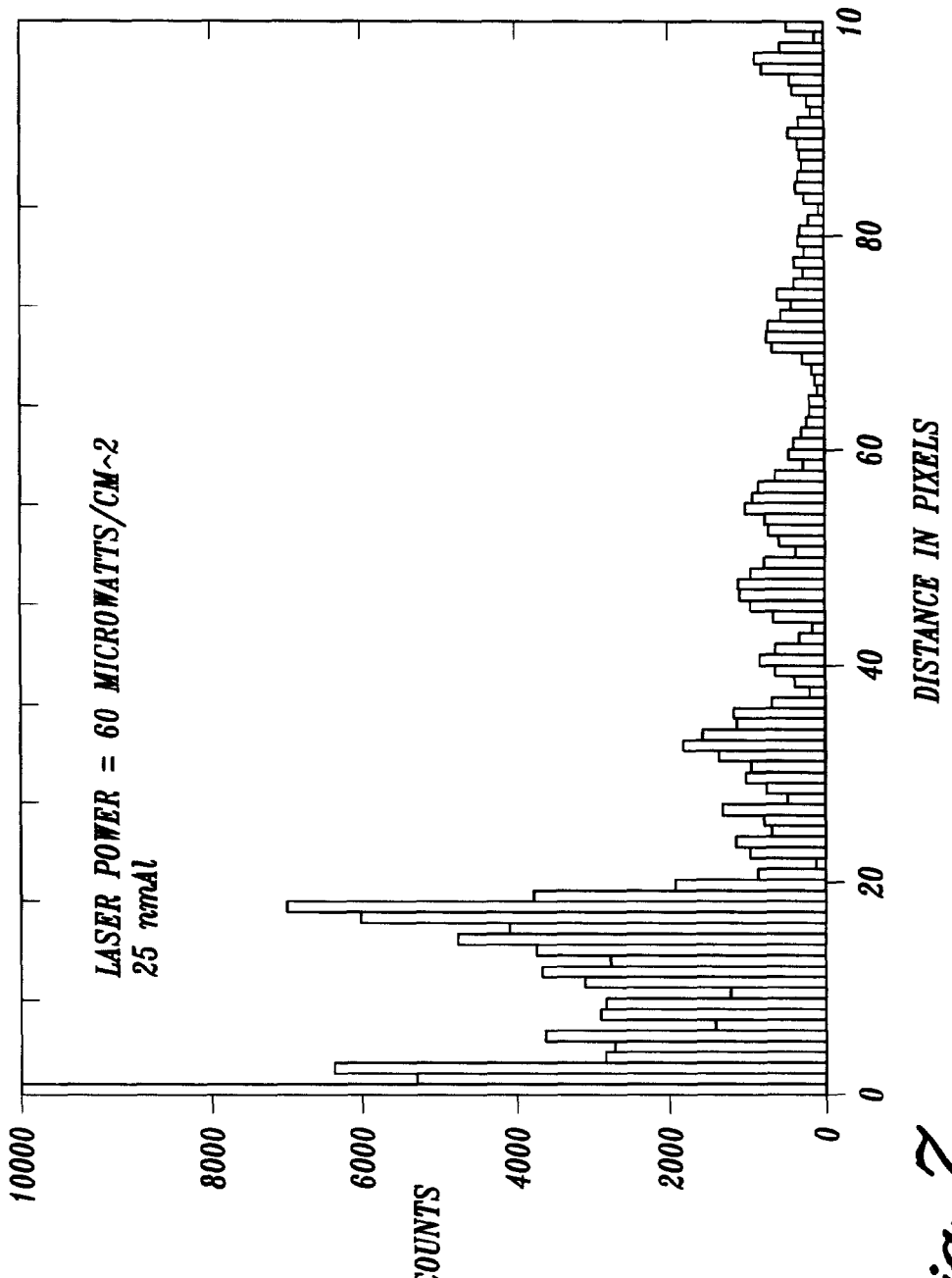
FIG. 7 is a graph illustrating the result of a computational Fourier transform of the signals from a detector array in accordance with the present invention.

In accordance with the present invention, the output of the photodetector array can be analyzed electronically by Fourier or other transforms to detect the spatially periodic component in the optical signal which is due to the fringes. In a Fourier transform, a signal is detected at the period of the several fringes detected by the array and harmonics of that fundamental period. See, for example, FIG. 7 which illustrates a representative Fourier transform analysis based on detected intensity as a function of the spatial period (distance as expressed by the number of pixels). In that case, a definite spike is detected at a spatial period corresponding to 19 pixels, which is the approximate preferred design criteria for the experimental embodiment.

Surprisingly, a very large range of incident radiation intensity is detectable, from approximately 200 nanowatts per centimeter squared to over 100 watts per centimeter squared. At higher power levels, the "image" captured by the detector array (Casio QV-10) exhibits substantial saturation and spreading, but still produced visible wide transverse bands associated with the fringes. At lower power levels, the image captured by the photodetector array is essentially black, with no visually detectable fringes, yet the Fourier transform of the average of four adjacent rows of pixels reveals a detectable spike in the spatial frequency domain. Thus, for a wide range of incident coherent energy wavelengths and power levels, the system in accordance with the present invention can automatically provide a detection signal.

In summary, in the first embodiment of the invention described above, the spectral filter 14 limits incident light to a band centered around a wavelength or wavelengths of interest and can be used to adjust intensity. The wedge etalon acts as a coherence filter to reveal the presence of long coherence length energy, as from a laser. The coherence filter must be sufficiently thick so that the spectrally band limited background radiation will not interfere. This will be on the order of 0.5 millimeter, depending on the spectral filter bandwidth. The wedge etalon format provides tolerance for thermal variations, wavelength differences, and a broad range of arrival angles, by providing a plurality, preferably several, spatially diverse areas of constructive interference. The photodetector array is read out in a spatially parallel manner, and the analog pixel values examined for spatially periodic signals produced by laser interference fringes. A discrete Fourier transform analysis can be performed in analog electronics represented by box 38 in FIG. 1. Each fringe is preferably sampled by a plurality of adjacent pixels in each dimension, i.e., processing of the fringe pattern is by more than one row of individual photodetectors.

Figure 8:
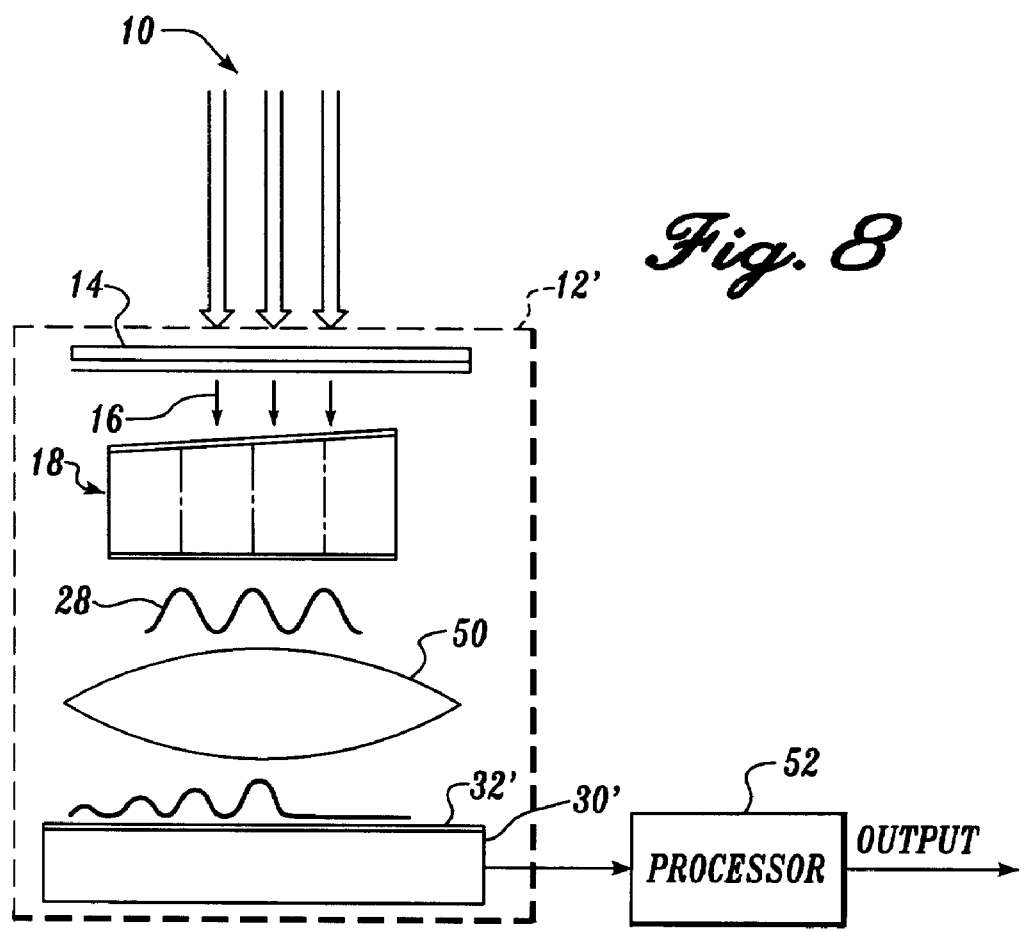
FIG. 8 (on the drawing sheet with FIG. 6) is a diagrammatic side elevation of a second embodiment of the present invention using an optical Fourier transform lens.

A second embodiment of the present invention is illustrated in FIG. 8 (on the drawing sheet with FIG. 6). Radiant energy 10 is incident upon a modified detector 12' in accordance with the present invention. Like the first embodiment, the detector 12' can include a spectral bandpass filter 14, and energy 16 passed by the filter is incident upon an interfering element 18 in the form of a wedge etalon identical to the wedge etalon previously described. Line 28 represents the resulting interference pattern, i.e., the intensity spikes and nulls resulting from the coherent incident radiation and constructive and destructive interference within the etalon. In the embodiment of FIG. 8, however, rather than radiant energy passing through the etalon and impinging directly on a photodetector component, a Fourier transform optical lens 50 is interposed between the etalon and a photodetector component 30' having individual photodetectors 32'. The optical Fourier transform results in an array of bright dots in the Fourier plane whenever there is coherent radiation incident on the wedge etalon at frequencies within the design range. An additional element called a "fiberoptic plate" can be interposed between the etalon 18 and the lens 50. The fiberoptic plate is a faceplate composed of single-mode fibers with thin cladding fused together to form a solid plate. Each fiber in the fused plate retains its designed angular acceptance angle, described by the numerical aperture (NA). Single mode propagation does not retain information about arrival angle, so that the light may arrive from any number of different angles (within the fibers NA), but will always exit in a uniform direction. The fiberoptic plate functions to remove angular variation from the arriving laser energy, and presents a constantly aligned signal to the Fourier transform lens 50 and detector assembly 30'.

Figure 9:
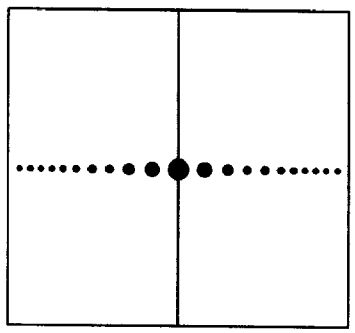
FIG. 9 is an illustration representing the fringe pattern of an optical Fourier transform.
Figure 10:
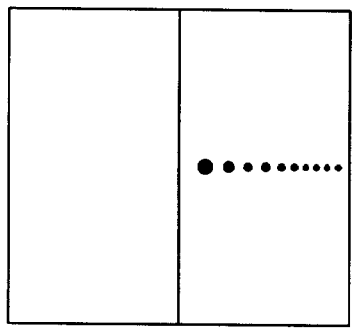
FIG. 10 is an illustration representing a fringe pattern of an optical Fourier transform in the present invention.

With reference to FIG. 9, the optical Fourier transform pattern for a series of bright fringes created by illuminating a grating or ruling such as a Ronchi ruled grating, is a symmetrical pattern of dots centered at the optical center of the lens. It has been discovered, however, that when a wedge etalon is used to create fringes, the Fourier transform pattern is asymmetric, as represented in FIG. 10. Thus, with reference to FIG. 11, a simple photodetector component 30' could use as few as two separate photodetectors 32', and the presence of coherent incident energy would be indicated by a substantial difference in the intensity detected by the two. The outputs from the photodetectors which are indicative of sensed intensity can be fed to a processor 52 as shown in FIG. 8 to provide an output indicating coherent light detection. Processing could use a simple comparator circuit of the type shown in FIG. 12, where $V_1$ is indicative of the intensity detected by one of the photodetectors 32' and $V_2$ is indicative of the intensity detected by the other. Ambient or incoherent radiation will not form fringes and will illuminate both sides, leading to no detection signal.

Optical processing of the wedge etalon fringes offers advantages over a computational transform, including the ability to use the information in the phase of the fringes. The optical transform does not suffer from low contrast, since even when the etalon fringes have zero intensity contrast at the transform plane, the phase information is sufficient to produce distinct transform dots. Direct imaging, as in the first embodiment, with an array of photodetectors will allow the fringe pattern to be processed, as with a computational Fourier transform, but the transform will be real mode, since only scalar intensity information can be detected in this manner. On the other hand, an optical transform, such as that done with a lens, will fully employ the complex phase information to produce a different transform than the electronic or computational version. In the case of a wedge etalon, for example, the electronic transform will produce a frequency spectrum which can go to zero across the space if the etalon intensities (fringe intensities) go to zero, or a very low contrast. Optical transforms, which use the complex phase information, always produce sharp, high contrast signals throughout the multivalued design space.

The point of processing the etalon fringes with a transform is to determine information which is not readily apparent from a direct examination of the fringes, such as fringe period, or detection of signal away from the DC band.

Figure 11:
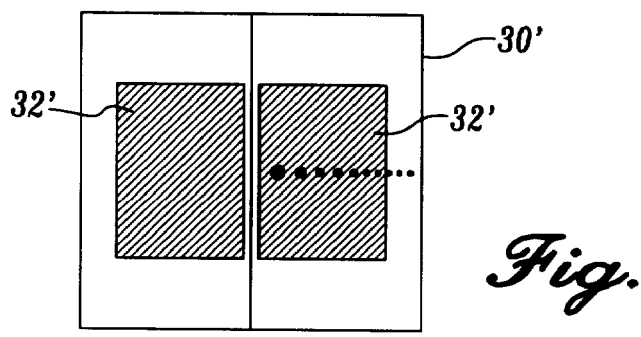
FIG. 11 is a diagrammatic representation of a detector component of the second embodiment of the present invention.
Figure 13:
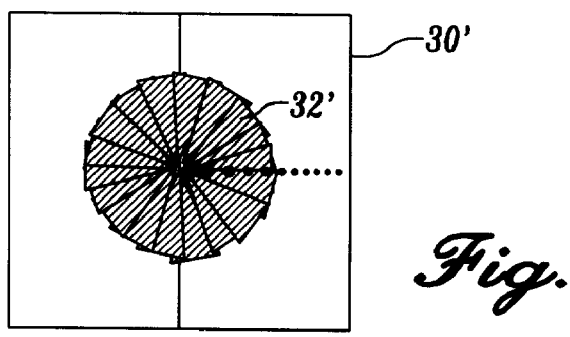
FIG. 13 (on the drawing sheet with FIGS. 9–11) is a diagrammatic representation of an alternative detector component for use with the second embodiment of the present invention.
Figure 12:
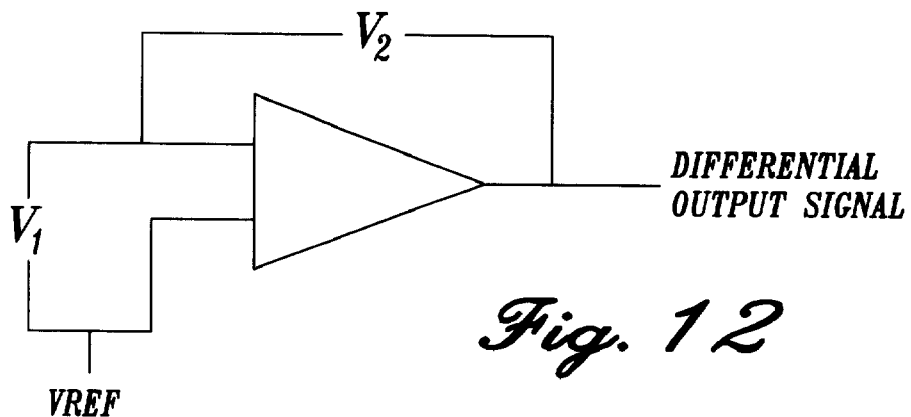
FIG. 12 is circuit diagram of part of a detector component that can be used with the second embodiment (FIG. 8).

Thus, with an optical Fourier transform lens, a simple detector of the type shown in FIG. 11 can be used. Alternatively, a more complex detector 30' with, for example, a circular array of individual photodetectors 32' can be used to provide unambiguous information on the angle of approach of the incident coherent radiation, as shown in FIG. 13.

Figure 14:
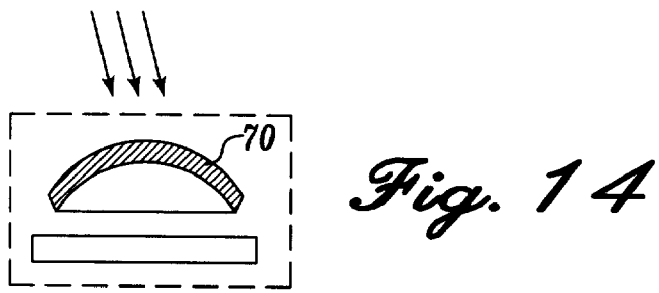
FIG. 14 is a diagrammatic side elevation of a modified coherent laser warning system in accordance with the present invention, with parts shown in section.

It is envisioned that more complex processing methods can be used to extract additional information from the optical Fourier transform of wedge etalon fringes. Desired information can include the arrival angle of the laser pulse in elevation and azimuth, and the wavelength of the radiation. The processing electronics can determine the pulse length, and the pulse repetition frequency. Wedge etalon fringes will vary in period as a function of both wavelength and arrival angle, so some means must be found to differentiate the two effects if specificity is desired. This may be accomplished by using a complex etalon structure involving angled subetalons or by the generalization to a curved, arced, or domed etalon which presents a range of angles to the incident laser energy at the same time, such as in FIG. 14.

Structures such as these create more complex fringe patterns, with fringes which are not, in general, equally spaced. This property will complicate the arrangement of the photodetector array and/or processing of the intensity information, but simplify the optics. The dome etalon 70 will form ring or elliptical intensity fringes which impinge on the photodetector array 72. The centroid location indicates elevation and azimuth to the source, and ring spacing indicates wavelength. Noncoherent illumination does not produce ring fringes. This variation on the first embodiment carries a substantial computational burden, but offers simple, compact optics with wide acceptance angle and freedom from some of the limitations of the planar wedge designs. In general, the space between the upper and lower reflective surfaces of dome etalon 70 will not be radially uniform, but will vary with angular positions to form a meniscus lens, or a meniscus with an imposed prism, forming an arced wedge etalon.

Figure 15:
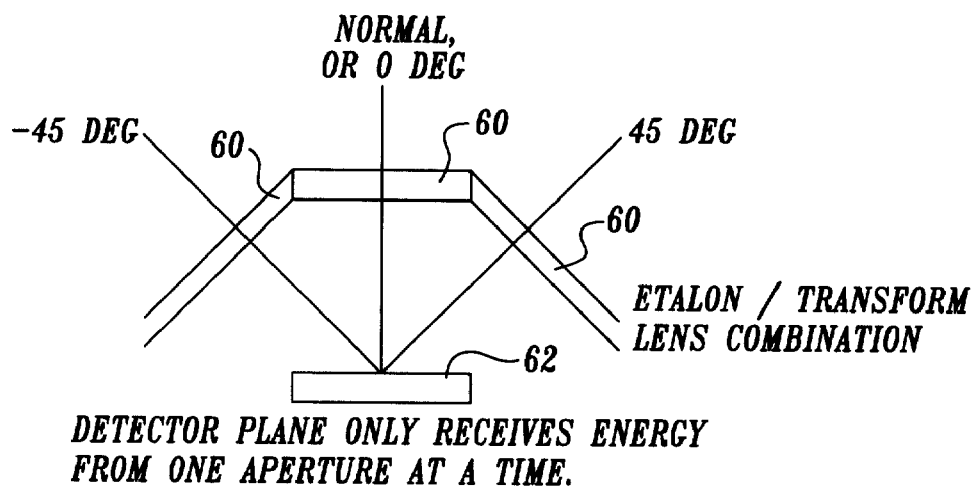
FIG. 15 is a diagrammatic side elevation of another embodiment of the present invention.

While the use of a transform lens increases the detector aperture, leading to greater sensitivity and improved signal-to-noise, a drawback to the optical approach will be a decrease in acceptance angle. The longer optical train of etalon, Fourier transform lens, and detector has a smaller acceptance angle than simply the wedge etalon and a closely spaced detector array. However, since the lenses required for the low resolution transform are simple and low cost, a compound design which uses only one detector structure is feasible. For example, FIG. 15 shows a system of wedge panes and lenslets. Each of the three sides 60 includes a wedge etalon and optical Fourier transform lens. For any given angle of incidence between plus and minus sixty degrees from the normal, a particular etalon-lens combination will illuminate the detector plane 62, while others which are illuminated at angles which are too steep will place their transformed energy away from the detector plane.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A system for detecting coherent radiant energy having a frequency of interest comprising:

an interferometer for producing a pattern of regularly spaced intensity fringes when impinged on by coherent radiant energy having a frequency of interest, the regular pattern including several intensity fringes with adjacent fringes spaced apart by a uniform distance, the interferometer being an etalon having top and bottom partially reflective surfaces spaced apart by a transmissive material, said top and bottom surfaces being spaced apart by a continuously variable distance along one dimension of the etalon, at least one of the top and bottom etalon surfaces being arcuate; and a transform element for analyzing a pattern of fringes produced by the interfering element to detect the pattern by performance of a spatial Fourier transform operation.

2. The system defined in claim 1, in which the top and bottom etalon surfaces are planar.

3. The system defined in claim 2, in which the distance between the top and bottom planar etalon surfaces varies along the one dimension by several wavelengths of a frequency of interest.

4. The system defined in claim 1, in which the transform element includes an array of photodetectors adjacent to a side of the interfering element opposite the side impinged on by coherent radiant energy having a frequency of interest, the array of photodetectors including closely spaced photodetector pixel elements having individual outputs, and means for computing a spatial Fourier transform based on the photodetector pixel element outputs.

5. The system defined in claim 4, including a prism interposed between the optical interfering element and the array of photodetectors to vary the optical path length.

6. The system defined in claim 4, in which the interfering element and the photodetector pixel elements are constructed and arranged relatively so that adjacent intensity fringes produced by the interfering element are separated by at least several of the photodetector pixel elements.

7. The system defined in claim 2, in which the individual photodetector pixel elements are arranged such that adjacent intensity fringes produced by the etalon will be separated by at least 19 separate photodetector pixel elements.

8. The system defined in claim 1, in which the transform element includes an optical Fourier transform component adjacent to the interfering element for receiving the intensity fringes produced thereby, and means for detecting the radiant energy passing through the optical transform lens and for detecting the presence of the pattern striking the optical Fourier transform component.

9. The system defined in claim 8, in which the optical Fourier transform component produces an asymmetrical intensity fringe pattern when impinged on by intensity fringes of the interfering element.

10. The system defined in claim 9, including means for processing the intensity fringe pattern produced by the optical Fourier transform component to detect the asymmetric nature of the fringe pattern.

11. The system defined in claim 10, in which the processing means includes symmetrically arranged photodetectors adjacent to the side of the optical Fourier transform component opposite the interfering element, the processing means including means for detecting an asymmetrical pattern of fringes on the symmetrically arranged detector components.

12. A system for detecting coherent radiant energy having a frequency of interest comprising:
    an etalon having top and bottom partially reflective surfaces spaced apart by a transmissive material, said top and bottom surfaces being spaced apart by a continuously variable distance along one dimension of the etalon for producing a spatial array of intensity fringes when impinged on by coherent radiant energy having a frequency of interest, at least one of the top and bottom etalon surfaces being arcuate; and
    a transform element for analyzing a spatial array of fringes produced by the etalon to detect the array by performance of a spatial Fourier transform operation.

13. The system defined in claim 12, in which both the top and bottom etalon surfaces are arcuate.

* * * * *

UNITED STATES PATENT AND TRADEMARK OFFICE
CERTIFICATE OF CORRECTION

PATENT NO. : 6,151,114
DATED : November 21, 2000
INVENTOR(S) : J.C. Russell

Page 1 of 1

It is certified that error appears in the above-identified patent and that said Letters Patent is hereby corrected as shown below:

Column 8,
Line 51 (Claim 2, line 1), "in which the top" should read -- in which both the top --
Line 52 (Claim 2, line 2), "planar." should read -- arcuate. --

Column 9,
Line 6 (Claim 7, line 2), "2," should read -- 6, --

Signed and Sealed this

Thirtieth Day of October, 2001

Attest:

NICHOLAS P. GODICI
Attesting Officer — Acting Director of the United States Patent and Trademark Office